United States Patent
Yong (10) Patent No.: US 8,170,419 B2
(45) Date of Patent: May 1, 2012

(54) IMAGE PROCESSING SYSTEM AND CONTROL METHOD THEREOF

(75) Inventor: Seok-woo Yong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 12/327,230

(22) Filed: Dec. 3, 2008

(65) Prior Publication Data

US 2010/0028013 A1   Feb. 4, 2010

(30) Foreign Application Priority Data

Jul. 29, 2008 (KR) .................. 10-2008-0073963

(51) Int. Cl.
*H04B 10/16* (2006.01)
*H04B 10/08* (2006.01)
(52) U.S. Cl. .................. 398/126; 398/106; 398/115
(58) Field of Classification Search .................. 398/112, 398/115–116, 126–127
See application file for complete search history.

(56) References Cited

U.S. PATENT DOCUMENTS

| | | | |
|---|---|---|---|
| 2002/0171624 | A1 | 11/2002 | Stecyk et al. |
| 2004/0203387 | A1 | 10/2004 | Grannan |
| 2007/0195195 | A1 | 8/2007 | Hicks |
| 2008/0028430 | A1 | 1/2008 | Kreiner et al. |

OTHER PUBLICATIONS

Communication and European Search Report issued on Aug. 10, 2010 in counterpart European Patent Application No. 09156498.9.

*Primary Examiner* — Leslie Pascal
(74) *Attorney, Agent, or Firm* — Sughrue Mion, PLLC (57) ABSTRACT

Provided are an image processing system and method thereof which communicates with an external image source device, the image processing system including: a display device which receives a modulated remote control signal modulated by a modulation method and demodulates the modulated remote control signal to generate a demodulated remote control signal and transmits the demodulated remote control signal; and a relay device which receives the demodulated remote control signal and modulates the demodulated remote control signal according to the modulation method to output an output remote control signal to the external image source device.

20 Claims, 5 Drawing Sheets

IMAGE PROCESSING SYSTEM AND CONTROL METHOD THEREOF

CROSS-REFERENCE TO RELATED APPLICATION

This application claims priority from Korean Patent Application No. 10-2008-0073963, filed on Jul. 29, 2008, in the Korean Intellectual Property Office, the disclosure of which is incorporated herein by reference.

BACKGROUND OF THE INVENTION

1. Field of the Invention

Apparatuses and methods consistent with the present invention relate to an image processing system and a control method thereof, and more particularly, to an image processing system in which a display device is spaced from an image source device, and a control method thereof.

2. Description of the Related Art

A remote controller is used by a user to control operations of various electronic devices from a remote area, and is separately provided for each electronic device's features. Together with the advancement in the electronic technologies, a user uses various electronic devices such as a TV, a set-top box, an audio or video player, and a remote controller is separately provided for each of the electronic devices.

If a display device displaying an image signal is spaced from an image source supplying an image signal, a user typically manipulates a remote controller in front of the display device. A remote control signal which is received from the remote controller may go through a relay device such as an infrared repeater to be transmitted to the image source.

However, if the remote control signal is not directly transmitted to the image source, it may be distorted. In that case, a control issue may arise for the image signal.

SUMMARY OF THE INVENTION

Accordingly, it is an aspect of the present invention to provide an image processing system which accurately transmits a remote control signal, and a control method thereof.

Also, it is another aspect of the present invention to provide an image processing system which has an improved reception rate of a remote control signal, and a control method thereof.

Additional aspects of the present invention will be set forth in part in the description which follows and, in part, will be obvious from the description, or may be learned by practice of the exemplary embodiments of present invention.

The foregoing and/or other aspects of the present invention are also achieved by providing an image processing system which communicates with an external image source device, the image processing system including: a display device which receives a modulated remote control signal modulated by a modulation method, and demodulates the modulated remote control signal to generate a demodulated remote control signal and transmits the demodulated remote control signal; and a relay device which receives the demodulated remote control signal from the display device and modulates the demodulated remote control signal according to the modulation method to generate an output remote control signal, and outputs the output remote control signal to the external image source device.

The modulated remote control signal may be modulated by an infrared communication method and transmitted to the display device as the modulated remote control signal.

The modulation method may be one of a plurality of modulation methods, and a modulating frequency of the modulated remote control signal may differ for each of the modulation methods.

The display device may include a demodulator which receives and demodulates the modulated remote control signal to generate the demodulated remote control signal; a first controller which determines a modulating frequency of the modulated remote control signal from the demodulated remote control signal; and a first communication unit which transmits frequency information and the demodulated remote control signal to the relay device.

The first controller may include a storage unit which stores the frequency information, wherein the frequency information corresponds to at least one of the modulating frequency of the modulated remote control signal and modulating frequency information corresponding to the external image source device.

The relay device may include a second communication unit which receives the frequency information and the demodulated remote control signal; a plurality of modulators which each modulate the demodulated remote control signal based on different modulating frequencies corresponding to the plurality of modulation methods; and a second controller which controls one of the plurality of modulators to modulate the demodulated remote control signal based on the frequency information.

The relay device may include a second communication unit which receives the demodulated remote control signal; a plurality of modulators which modulate the demodulated remote control signal based on different modulating frequencies corresponding to each of the plurality of modulation methods; and a second controller which determines the modulating frequency of the demodulated remote control signal from the demodulated remote control signal and controls one of the plurality of modulators to modulate the demodulated remote control signal according to the modulating frequency.

The second controller may include a storage unit which stores therein frequency information, wherein the frequency information corresponds to at least one of the modulating frequency of the modulated remote control signal and modulating frequency information about the modulating frequency corresponding to the external image source device.

The foregoing and/or other aspects of the present invention are also achieved by providing an image processing system including: a display device which receives a modulated remote control signal modulated by a modulation method according to an infrared communication method, and demodulates the modulated remote control signal modulated by the modulation method according to the infrared communication method, to generate a demodulated remote control signal, and transmits modulating information about the modulation method determined from the demodulated remote control signal; and a relay device which modulates the demodulated remote control signal according to the modulating information about the modulation method among a plurality of modulation methods to output the remote control signal to the external image source device.

The modulating information may include a modulating frequency of the received modulated remote control signal.

The display device may include a demodulator which receives and demodulates the modulated remote control signal; a first controller which determines the modulating frequency and code information about a control of the external image source device from the demodulated remote control signal; and a first communication unit which transmits frequency information about the modulating frequency and the code information to the relay device.

The relay device may include a second communication unit which receives the frequency information and the code information, a plurality of modulators which modulate the demodulated remote control signal based on different modulating frequencies corresponding to the plurality of modulation methods; and a second controller which generates the remote control signal with the code information, and controls one of the plurality of modulators to modulate the output remote control signal based on the frequency information.

The first communication unit may transmit the demodulated remote control signal and frequency information with a wireless LAN.

The first communication unit may transmit the demodulated remote control signal and frequency information with an optical carrier.

The first communication unit may include an infrared repeater.

The relay device may include a set-top box to be connected to the external image source device.

The foregoing and/or other aspects of the present invention are also achieved by providing a control method of an image processing system which includes a display device to receive a modulated remote control signal output by a remote control device and a relay device to transmit an output remote control signal to an external image source device, the control method including: receiving, by the display device, a modulated remote control signal from the remote control device; demodulating the modulated remote control signal to generate a demodulated remote control signal, wherein the modulated remote control signal is modulated by a modulating frequency; determining a modulating frequency of the demodulated remote control signal; and modulating the demodulated remote control signal by the modulating frequency to generate the output remote control signal; and outputting the output remote control signal to the external image source device.

The display device may perform the determining the modulating frequency, the method further including: transmitting the demodulated remote control signal and the determined modulating frequency to the relay device.

The display device may perform the determining of the modulating frequency, the method further including: determining code information about a control of the external image source device from the demodulated remote control signal; transmitting frequency information about the modulating frequency and the code information to the relay device; and generating the output remote control signal by the relay device based on the frequency information and the code information before the modulating and outputting of the remote control signal.

The relay device may perform the determining of the modulating frequency, the method further including: transmitting the demodulated remote control signal to the relay device after the receiving and demodulating of the demodulated remote control signal.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
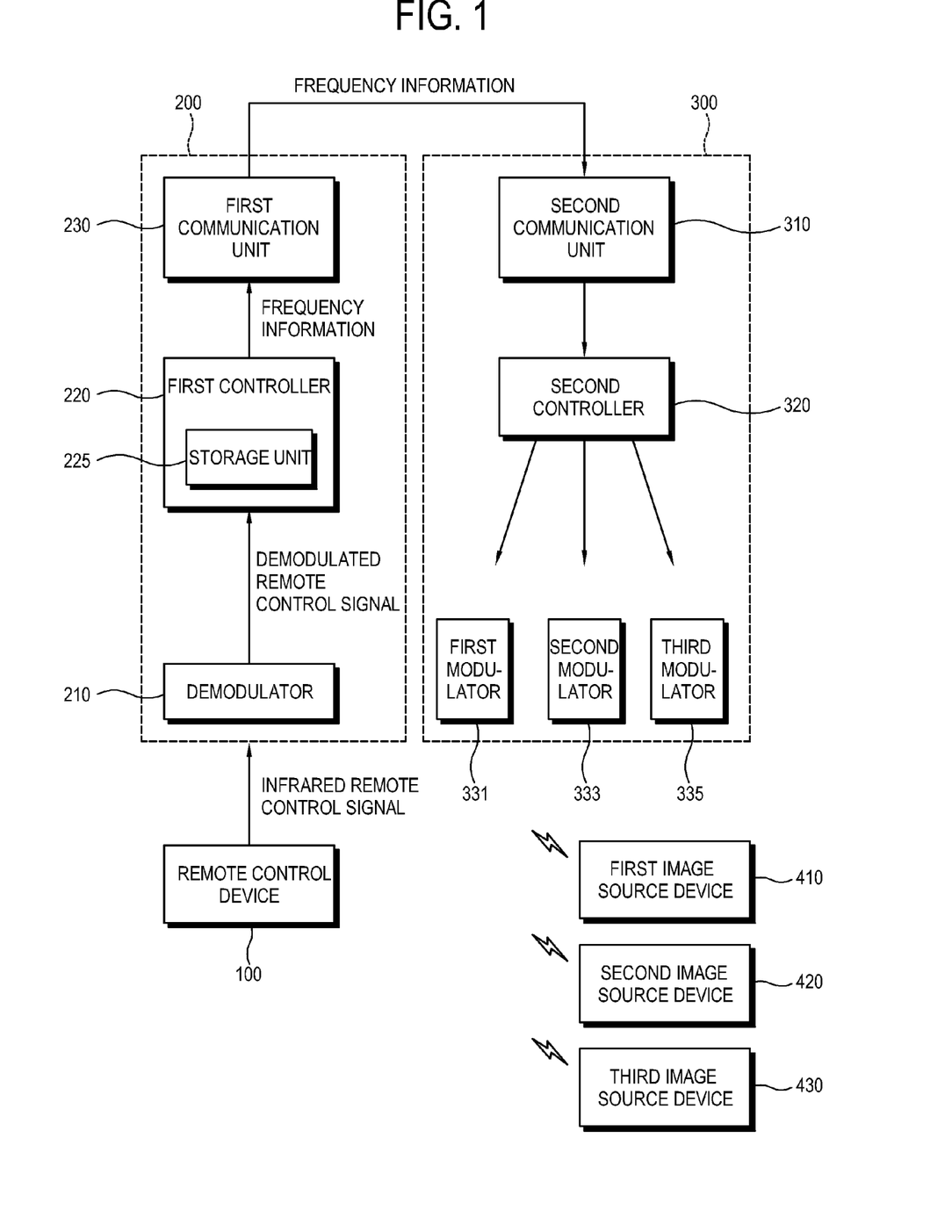
FIG. 1 is a control block diagram of an image processing system according to an exemplary embodiment of the present invention.

FIG. 1 is a control block diagram of an image processing system according to an exemplary embodiment of the present invention.

As shown therein, the image processing system includes a display device 200 and a relay device 300. The image processing system processes and displays an image signal which is output by image source devices 410, 420 and 430. The image processing system is provided between a remote control device 100 generating a remote control signal and a plurality of image source devices 410, 420 and 430 controlled by the remote control signal to communicate with them. Typically, an image source device supplying image sources is adjacent to a display device, and a user uses a remote control device accompanied with the image source device to control the image source device. Meanwhile, an exemplary embodiment of the present invention relates to a control of a remote control signal if the image source devices 410, 420 and 430 supplying image signals are spaced from the display device 200 displaying the image signals, i.e., if a user is far away from the image source devices 410, 420 and 430. A user uses the remote control device 100 corresponding to the image source devices 410, 420 and 430 in front of the display device 200 and controls the far distant image source devices 410, 420 and 430. If a user manipulates the remote control device 100 in front of the display device 200, the image processing system processes the remote control signal output by the remote control device 100, transmits the processed signal to the image source devices 410, 420 and 430 accurately and displays an image signal controlled by the image source devices 410, 420 and 430 on the display device 200.

The remote control device 100 corresponds to a control device controlling one of the plurality of image source devices 410, 420 and 430, and modulates a remote control signal by using an infrared communication method, i.e., by an infrared wavelength. The remote control signal is modulated by various known methods, e.g., by variably adjusting a pulse width or varying frequency of signals. The image processing system receives a remote control signal and modulates the signal with the same method as that initially used by the remote control device 100 and then outputs the signal to the image source devices 410, 420 and 430.

According to another exemplary embodiment, the remote control device 100 may include an integrated remote controller which controls the plurality of image source devices 410, 420 and 430 as a whole instead of controlling each of the image source devices 410, 420 and 430.

The image source devices 410, 420 and 430 may vary as long as they supply an image signal, including a set-top box, a DVD player, a play station, XBOX, etc. Each of the image source devices 410, 420 and 430 may include their own remote control devices 100 or may be controlled by an integrated remote controlled as described above.

As shown therein, the display device 200 includes a demodulator 210, a first controller 220 and a first communication unit 230 while the relay device 300 includes a second communication unit 310, a second controller 320 and a plurality of modulators 331, 333 and 335.

The demodulator 210 receives and demodulates a remote control signal which is modulated and output by the remote control device 100. As described above, the remote control device 100 outputs a remote control signal modulated with an infrared communication method by changing a pulse width or varying frequency. That is, the demodulator 210 communicates with the remote control device 100 with the infrared communication method.

The first controller 220 determines a modulating frequency of a remote control signal from the demodulated remote control signal. According to an exemplary embodiment of the present invention, the image processing system determines a modulating frequency of a remote control signal modulated in various methods, modulates the remote control signal again according to the modulating frequency initially modulated from the remote control device 100 and supplies the remote control signal to the image source devices 410, 420 and 430. According to the present exemplary embodiment, the display device 200 is what determines a modulating frequency of the remote control signal. To support the function, the first controller 220 includes a storage unit 225. Typically, the remote control signal is modulated according to a certain modulating frequency which varies by the image source devices 410, 420 and 430 or by manufacturers of the image source devices 410, 420 and 430. The storage unit 225 stores therein frequency information about a known modulating frequency used for modulating the remote control signal by a manufacturer or a modulating frequency corresponding to specific image source devices 410, 420 and 430.

The first communication unit 230 transmits frequency information about the remote control signal determined by the first controller 220 and the modulated remote control signal to the relay device 300. The first communication unit 230 communicates with the second communication unit 310 of the relay device 300 to transmit and receive a remote control signal, and may include an infrared repeater to reinforce the remote control signal. The first communication unit 230 may transmit the frequency information and remote control signal with a specific communication method. For example, the second communication unit 310 may transmit the demodulated remote control signal and frequency information with a wireless LAN or Bluetooth or with an optical communication method by using an optical carrier.

The second communication unit 310 receives frequency information and the modulated remote control signal, and demodulates the modulated signal when the first communication unit 230 modulated the remote control signal with a specific communication method.

The plurality of modulators 331, 333 and 335 modulates a signal according to different modulating frequencies. For example, the first modulator 331 modulates a remote control signal in 38 KHz, the second modulator 333 modulates a remote control signal in 41 KHz, and the third modulator 335 modulates a remote control signal according to a modulating frequency different from those of the first and second modulators 331 and 333.

The second controller 320 controls one of the plurality of modulators 331, 333 and 335 to modulate a remote control signal based on concerned frequency information. If a remote control signal goes through a relay device because of the spaced remote control device and image source device, a related art relay device modulates a remote control signal according to a specific modulating frequency regardless of the initial modulating frequency of the remote control signal. For example, while a remote control device of a DVD player manufactured by a manufacturer uses a modulating frequency of 38 KHz, the relay device may modulate a remote control signal in 41 KHz regardless of a modulating frequency of the input remote control signal and output the signal to the image source device. In this case, the modulating frequency used by the image source device is different from the frequency of the received remote control signal, and the remote control signal may not be received accurately. Thus, a reception rate of the remote control signal decreases, and the image signal is not controlled efficiently. According to the present exemplary embodiment, the display device 200 determines a modulating frequency of an input remote control signal and transmits frequency information to the relay device 300. Thus, the relay device 300 may modulate the remote control signal again according to the modulating frequency initially transmitted from the remote control device 100. The remote control signal output by the relay device 300 accurately corresponds to the remote control signal initially output by the remote control device 100. The image source devices 410, 420 and 430 may receive a remote control signal modulated by an inherent modulating frequency used for communication with the remote control device 100. That is, the image source devices 410, 420 and 430 may receive a clear remote control signal without distortion, adjust an image signal according to the remote control signal and transmit the image signal back to the display device 200. The second controller 320 may include a switch (not shown) to select one of the plurality of modulators 331, 333 and 335. The number of modulators 331, 333 and 335 is at least two, but not limited to three.

Figure 2:
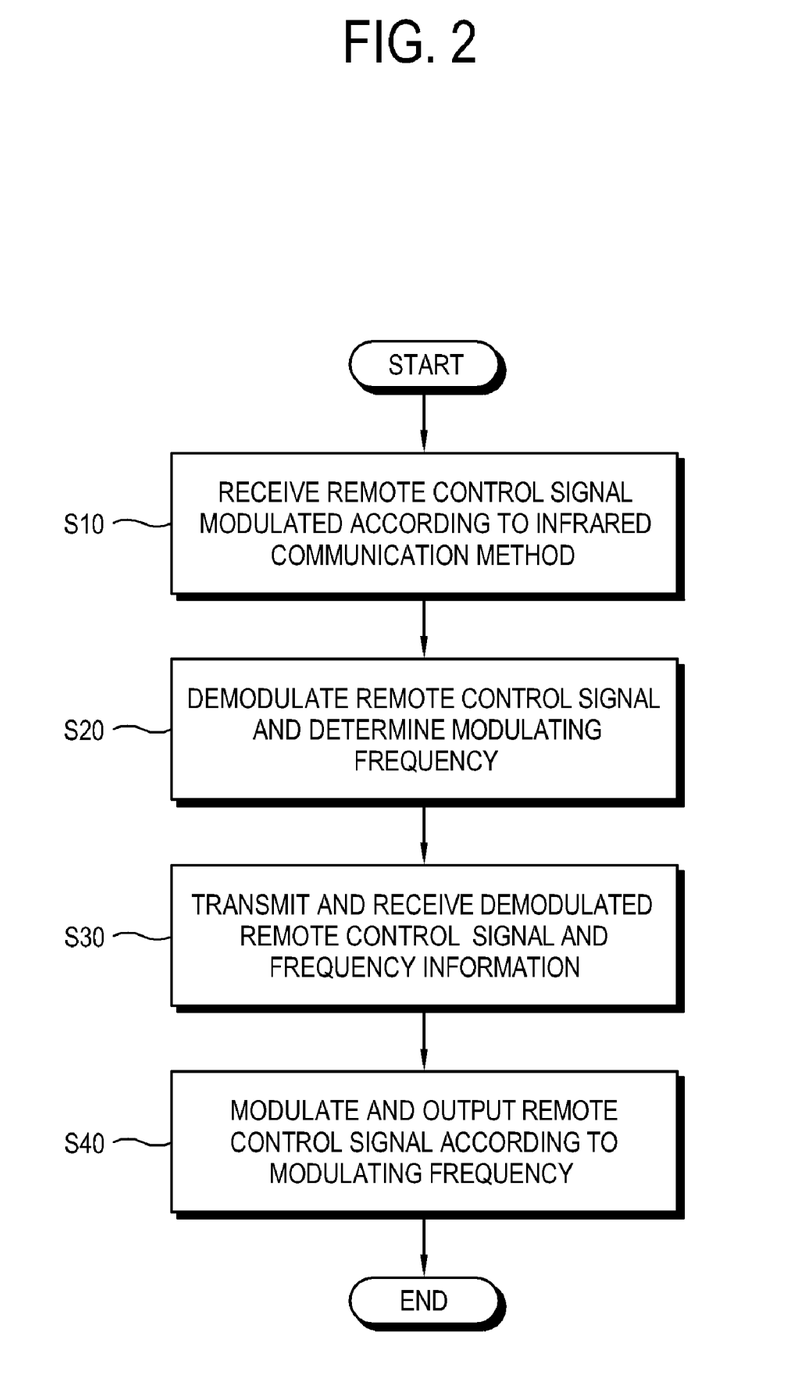
FIG. 2 is a control flowchart to describe a control method of the image processing system in FIG. 1.

FIG. 2 is a control flowchart to describe a control method of the image processing system in FIG. 1. Referring to FIG. 2, a transmission method of a remote control signal will be described as follows.

First, the display device 200 receives a remote control signal modulated according to the infrared communication method (S10).

The demodulator 210 demodulates the received remote control signal, and the first controller 220 determines a modulation method of the demodulated remote control signal, i.e., which modulating frequency is used to modulate the remote control signal (S20).

The demodulated remote control signal and frequency information corresponding to the modulating information about the remote control signal are transmitted from the display device 200 to the relay device 300 by the first and second communication units 230 and 310 (S30).

The second controller 320 of the relay device 300 modulates the received remote control signal according to the modulating frequency and outputs the remote control signal to the image source devices 410, 420 and 430 (S40).

Figure 3:
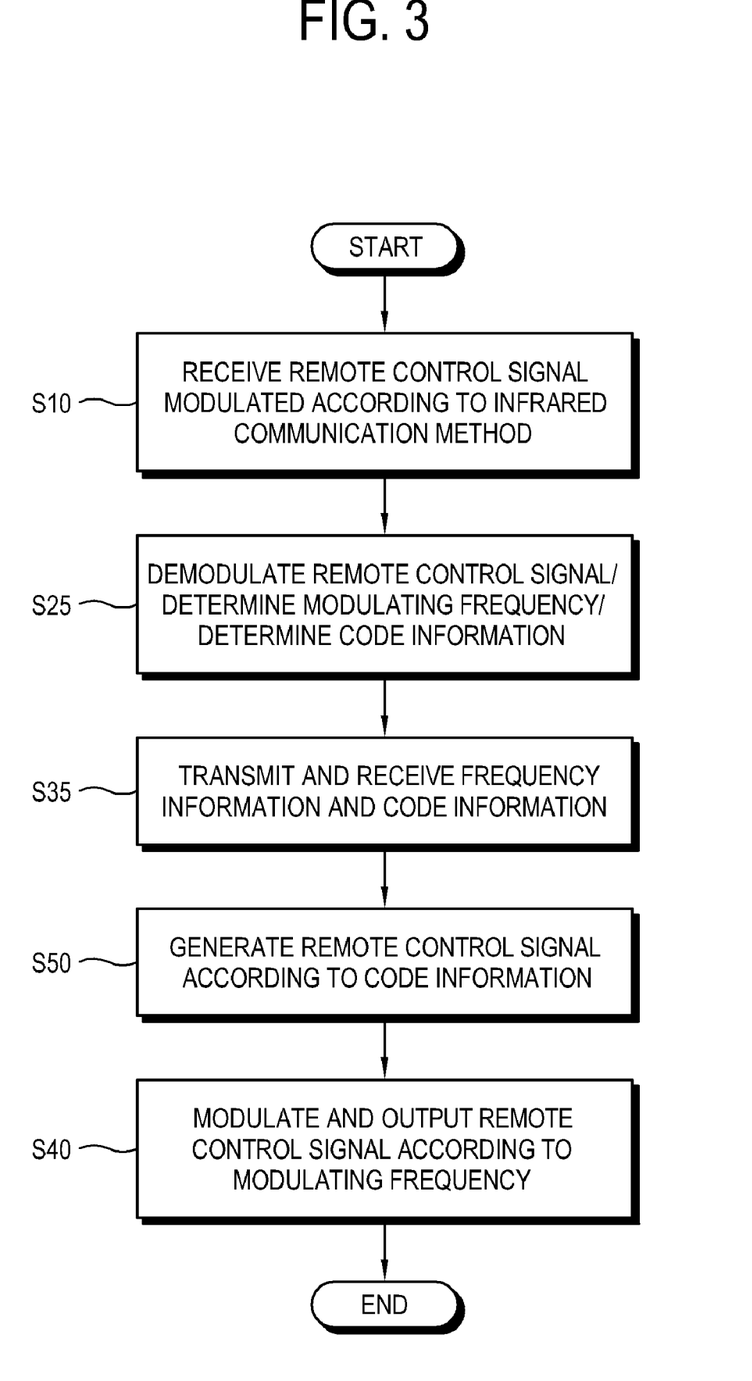
FIG. 3 is a control flowchart to describe another control method of the image processing system in FIG. 1.

FIG. 3 is a control flowchart to describe another control method of the image processing system in FIG. 1.

The image processing system receives a remote control signal modulated according to the infrared communication method (S10).

According to the present exemplary embodiment, if the demodulator 210 demodulates the received remote control signal, the first controller 220 determines code information about the remote control signal together with the modulating frequency of the demodulated remote control signal (S25). The term code information means set data about the remote control signal output by the remote control device corresponding to a specific image control. The code information may differ by manufacturer or image source device. The first controller 220 transmits the code information together with the frequency information instead of transmitting the remote control signal to the relay device 300 through the first communication unit 230, and the second communication unit 310 outputs the received frequency information and code information to the second controller 320 (S35).

The second controller 320 generates a remote control signal according to the code information (S50). The second controller 320 may include a signal generator (not shown) to generate an infrared signal corresponding to the code information. The image processing system according to the present exemplary embodiment may maintain fast signal transmission and transmit an accurate remote control signal to the image source devices 410, 420 and 430 by transmitting only code information corresponding to the remote control signal instead of transmitting and receiving the remote control signal.

Lastly, the second controller 320 modulates the generated remote control signal according to the modulating frequency and outputs the remote control signal to the image source devices 410, 420 and 430 (S40).

Figure 4:
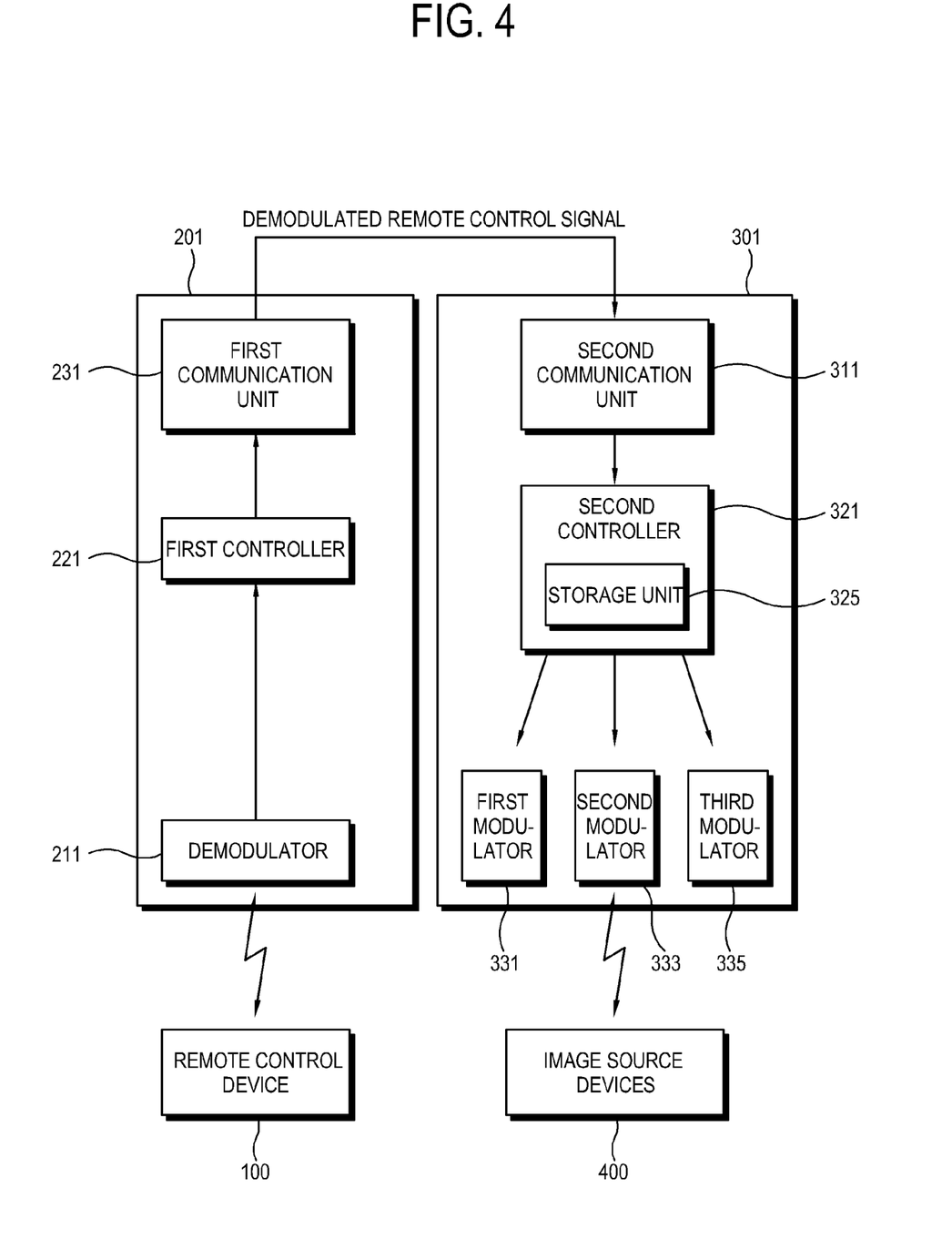
FIG. 4 is a control block diagram of an image processing system according to another exemplary embodiment of the present invention.

FIG. 4 is a control block diagram of an image processing system according to another exemplary embodiment of the present invention.

As shown therein, a display device 201 includes a first communication unit 230, a first controller 221 and a demodulator 211. A relay device 301 includes a second communication unit 311, a second controller 321 having a storage unit 325, and a plurality of modulators 331, 333 and 335.

The first controller 221 transmits a remote control signal demodulated by the demodulator 211 to the first communication unit 231, but does not determine a modulation method of the remote control signal.

According to the present exemplary embodiment, the modulating frequency of the remote control signal is determined not by the first controller 220 but by the second controller 321. The second controller 321 may include a storage unit 325 storing modulating information corresponding to the image source device 400, i.e., modulating frequency. The second controller 321 inputs a remote control signal to one of the plurality of modulators 331, 333 and 335 to modulate the remote control signal according to the determined modulating frequency, and outputs the remote control signal from the modulators 331, 333 and 335 to the image source device 400.

The first communication unit 231, the demodulator 211, the second communication unit 311 and the modulators 331, 333 and 335 are substantially equivalent to those in FIG. 1.

Figure 5:
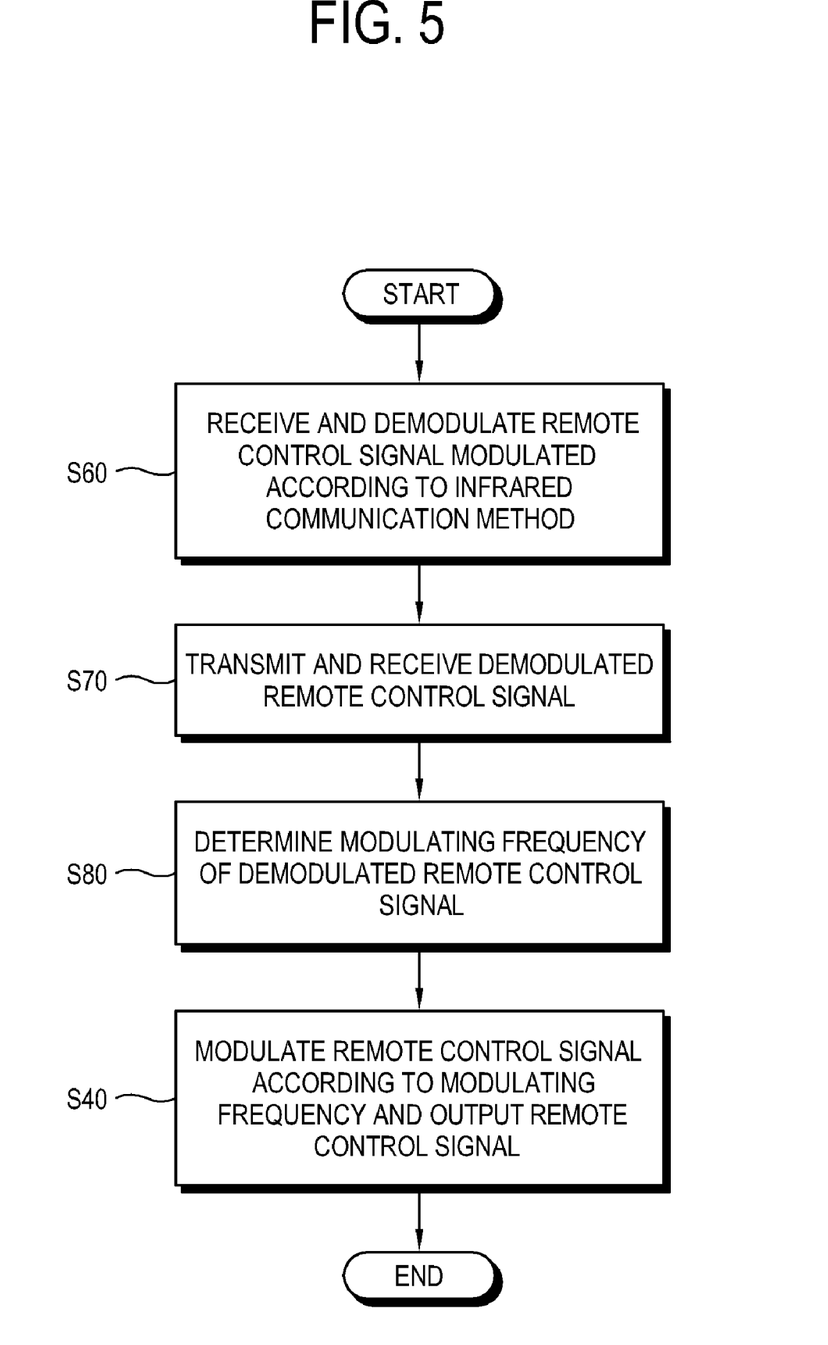
FIG. 5 is a control flowchart to describe a control method of the image processing system in FIG. 4.

Referring to FIG. 5, the control method of the image processing system in FIG. 4 will be described as follows. First, the display device 201 receives and demodulates a remote control signal modulated by the infrared communication method (S60), and transmits the remote control signal to the relay device 301 (S70).

The second controller 321 which receives the demodulated remote control signal determines the modulating frequency of the remote control signal (S80), and modulates the remote control signal according to the determined modulating frequency to output the remote control signal to the image source device 400 (S40).

The present invention modulates a remote control signal according to a modulation method initially used by the relay devices 300 and 301, i.e., according to a modulating frequency of the remote control signal so as to transmit the remote control signal input to the display devices 200 and 201 to the image source device 400 in an original state. The modulating frequency of the remote control signal may be determined by any of the display devices 200 and 201 or the relay devices 300 and 301, and not a remote control signal but code information may be transmitted from the display device 200 to the relay device 300.

As described above, an image processing system and a control method thereof according to an exemplary embodiment of the present invention transmits a remote control signal accurately.

Also, the image processing system and a control method thereof according to the exemplary embodiment of the present invention improves a reception rate of a remote control signal.

Further, the image processing system and a control method thereof according to the exemplary embodiment of the present invention re-modulates a remote control signal which was modulated according to a plurality of modulating frequencies, according to an initially used modulating frequency and transmits the remote control signal to an image source device.

Further, an image processing system and a control method thereof according to another exemplary embodiment of the present invention transmits and receives code information about a remote control signal and controls an image source device without difficulty.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing system which communicates with an external image source device, the image processing system comprising:
   a display device which receives a modulated remote control signal modulated by a modulation method, demodulates the modulated remote control signal to generate a demodulated remote control signal and transmits the demodulated remote control signal; and
   a relay device which receives the demodulated remote control signal from the display device and modulates the demodulated remote control signal according to the modulation method to generate an output remote control signal, and outputs the output remote control signal to the external image source device,
   wherein the relay device is independent from the display device.

2. The image processing system according to claim 1, wherein the modulated remote control signal is modulated by an infrared communication method and transmitted to the display device as the modulated remote control signal.

3. The image processing system according to claim 2, wherein the modulation method is one of a plurality of modulation methods, and a modulating frequency of the modulated remote control signal differs for each of the plurality of modulation methods.

4. The image processing system according to claim 3, wherein the display device comprises a demodulator which receives and demodulates the modulated remote control signal to generate the demodulated remote control signal;
   a first controller which determines the modulating frequency of the modulated remote control signal from the demodulated remote control signal; and a first communication unit which transmits frequency information and the demodulated remote control signal to the relay device.

5. The image processing system according to claim 4, wherein the first controller comprises a storage unit which stores the frequency information, wherein the frequency information corresponds to at least one of the modulating frequency of the modulated remote control signal and modulating frequency information corresponding to the external image source device.

6. The image processing system according to claim 4, wherein the relay device comprises a second communication unit which receives the frequency information and the demodulated remote control signal;
   a plurality of modulators which each modulate the demodulated remote control signal based on different modulating frequencies corresponding to the plurality of modulation methods; and
   a second controller which controls one of the plurality of modulators to modulate the demodulated remote control signal based on the frequency information.

7. The image processing system according to claim 4, wherein the first communication unit transmits the demodulated remote control signal and frequency information with a wireless LAN.

8. The image processing system according to claim 4, wherein the first communication unit transmits the demodulated remote control signal and frequency information with an optical carrier.

9. The image processing system according to claim 4, wherein the first communication unit comprises an infrared repeater.

10. The image processing system according to claim 3, wherein the relay device comprises a second communication unit which receives the demodulated remote control signal;
    a plurality of modulators which modulate the demodulated remote control signal based on different modulating frequencies corresponding to each of the plurality of modulation methods; and
    a second controller which determines the modulating frequency of the demodulated remote control signal from the demodulated remote control signal and controls one of the plurality of modulators to modulate the demodulated remote control signal according to the modulating frequency.

11. The image processing system according to claim 10, wherein the second controller comprises a storage unit which stores therein frequency information, wherein the frequency information corresponds to at least one of the modulating frequency of the modulated remote control signal and modulating frequency information corresponding to the external image source device.

12. The image processing system according to claim 1, wherein the relay device comprises a set-top box to be connected to the external image source device.

13. An image processing system, comprising:
    a display device which receives a modulated remote control signal modulated by a modulation method according to an infrared communication method, and demodulates the modulated remote control signal modulated by the modulation method according to the infrared communication method, to generate a demodulated remote control signal, and transmits modulating information about the modulation method determined from the demodulated remote control signal; and
    a relay device which modulates the demodulated remote control signal according to the modulating information about the modulation method among a plurality of modulation methods to output the remote control signal to the external image source device,
    wherein the relay device is independent from the display device.

14. The image processing system according to claim 13, wherein the modulating information comprises a modulating frequency of the received modulated remote control signal.

15. The image processing system according to claim 14, wherein the display device comprises a demodulator which receives and demodulates the modulated remote control signal;
    a first controller which determines the modulating frequency and code information about a control of the external image source device from the demodulated remote control signal; and
    a first communication unit which transmits frequency information about the modulating frequency and the code information to the relay device.

16. The image processing system according to claim 15, wherein the relay device comprises a second communication unit which receives the frequency information and the code information,
    a plurality of modulators which modulate the demodulated remote control signal based on different modulating frequencies corresponding to the plurality of modulation methods; and
    a second controller which generates an output remote control signal with the code information, and controls one of the plurality of modulators to modulate the output remote control signal based on the frequency information.

17. A control method of an image processing system which comprises a display device to receive a modulated remote control signal output by a remote control device and a relay device to transmit an output remote control signal to an external image source device, the control method comprising:
    receiving, by the display device, a modulated remote control signal from the remote control device;
    demodulating the modulated remote control signal to generate a demodulated remote control signal, wherein the modulated remote control signal is modulated by a modulating frequency;
    determining a modulating frequency of the demodulated remote control signal; and
    modulating, by the relay device which is independent from the display device, the demodulated remote control signal by the modulating frequency to generate the output remote control signal; and
    outputting the output remote control signal to the external image source device.

18. The control method according to claim 17, wherein the display device performs the determining of the modulating frequency, the method further comprising:
    transmitting the demodulated remote control signal and the modulating frequency to the relay device.

19. The control method according to claim 17, wherein the display device performs the determining of the modulating frequency, the method further comprising:
    determining code information about a control of the external image source device from the demodulated remote control signal;
    transmitting frequency information about the modulating frequency and the code information to the relay device; and
    generating the output remote control signal by the relay device based on the frequency information and the code information before the modulating and outputting of the output remote control signal.

20. The control method according to claim 17, wherein the relay device performs the determining of the modulating frequency, the method further comprising:

transmitting the demodulated remote control signal to the relay device after the receiving and demodulating of the demodulated remote control signal.

* * * * *